(12) United States Patent
Elad et al.

(10) Patent No.: US 11,747,440 B2
(45) Date of Patent: Sep. 5, 2023

(54) RECONFIGURABLE MIMO RADAR

(71) Applicant: Ay Dee Kay LLC, Aliso Viejo, CA (US)

(72) Inventors: Danny Elad, Kibutz Matzuva (IL); Ofer Markish, Nesher (IL); Benny Sheinman, Haifa (IL)

(73) Assignee: Ay Dee Kay LLC, Aliso Viejo, CA (US)

( * ) Notice: Subject to any disclaimer, the term of this patent is extended or adjusted under 35 U.S.C. 154(b) by 121 days.

(21) Appl. No.: 17/338,407

(22) Filed: Jun. 3, 2021

(65) Prior Publication Data

US 2021/0293926 A1 Sep. 23, 2021

Related U.S. Application Data

(63) Continuation of application No. 16/203,149, filed on Nov. 28, 2018, now Pat. No. 11,047,956.
(Continued)

(51) Int. Cl.
*G01S 7/41* (2006.01)
*G01S 13/89* (2006.01)
(Continued)

(52) U.S. Cl.
CPC ............... *G01S 7/411* (2013.01); *G01S 7/285* (2013.01); *G01S 7/292* (2013.01); *G01S 7/352* (2013.01); *G01S 7/42* (2013.01); *G01S 13/89* (2013.01); *G01S 13/931* (2013.01); *G01S 7/52017* (2013.01); *H04B 7/0413* (2013.01)

(58) Field of Classification Search
CPC .... H04B 7/0413; H04B 7/024; H04B 7/0452; G01S 7/411; G01S 7/42; G01S 13/89; G01S 13/931

See application file for complete search history.

(56) References Cited

U.S. PATENT DOCUMENTS 4,283,767 A * 8/1981 Rountree .............. G01S 3/8006
  367/901
4,924,235 A * 5/1990 Fujisaka ................. G01S 13/48
  342/158

(Continued)

FOREIGN PATENT DOCUMENTS

DE  102004034429 A1  2/2006
DE  10200903214 A1   1/2010
WO  2013192265 A1    12/2013

OTHER PUBLICATIONS

International Search Report and Written Opinion for Counterpart International Application No. PCT/US2019/028966, dated Sep. 3, 2019, 13 pages.

*Primary Examiner* — Peter M Bythrow
(74) *Attorney, Agent, or Firm* — Steven Stupp

(57) ABSTRACT

Automotive radar systems may employ a reconfigurable connection of antennas to radar transmitters and/or receivers. An illustrative embodiment of an automotive radar system includes: a radar transmitter; a radar receiver; and a digital signal processor coupled to the radar receiver to detect reflections of a signal transmitted by the radar transmitter and to derive signal measurements therefrom. At least one of the radar transmitter and the radar receiver are switchable to provide the digital signal processor with signals from each of multiple combinations of transmit antenna and receive antenna.

8 Claims, 4 Drawing Sheets

Related U.S. Application Data

(60) Provisional application No. 62/684,982, filed on Jun. 14, 2018.

(51) Int. Cl.
*G01S 7/42* (2006.01)
*G01S 13/931* (2020.01)
*G01S 7/285* (2006.01)
*G01S 7/35* (2006.01)
*G01S 7/292* (2006.01)
*G01S 7/52* (2006.01)
*H04B 7/0413* (2017.01)

(56) References Cited

U.S. PATENT DOCUMENTS

| | | | | |
|---|---|---|---|---|
| 5,933,109 | A * | 8/1999 | Tohya | H01Q 1/3233 |
| | | | | 342/175 |
| 5,955,991 | A * | 9/1999 | Kawakubo | H01Q 3/26 |
| | | | | 342/127 |
| 6,031,483 | A * | 2/2000 | Urabe | G01S 13/345 |
| | | | | 342/128 |
| 6,067,048 | A * | 5/2000 | Yamada | G01S 13/426 |
| | | | | 342/25 R |
| 6,107,956 | A * | 8/2000 | Russell | G01S 7/4056 |
| | | | | 342/158 |
| 6,288,672 | B1 * | 9/2001 | Asano | G01S 13/02 |
| | | | | 342/368 |
| 6,292,129 | B1 * | 9/2001 | Matsugatani | G01S 13/345 |
| | | | | 342/107 |
| 6,337,656 | B1 * | 1/2002 | Natsume | G01S 13/44 |
| | | | | 342/149 |
| 6,611,225 | B2 * | 8/2003 | Mitsumoto | G01S 13/345 |
| | | | | 342/111 |
| 6,646,589 | B2 * | 11/2003 | Natsume | G01S 7/354 |
| | | | | 342/107 |
| 7,173,561 | B2 * | 2/2007 | Isaji | H04B 7/0604 |
| | | | | 342/107 |
| 7,495,603 | B2 * | 2/2009 | Honda | G01S 13/4409 |
| | | | | 342/79 |
| 7,898,460 | B2 * | 3/2011 | Nishimura | G01S 3/48 |
| | | | | 342/28 |
| 8,064,533 | B2 * | 11/2011 | Rofougaran | H01Q 1/2225 |
| | | | | 375/267 |
| 8,289,203 | B2 * | 10/2012 | Culkin | H01Q 21/061 |
| | | | | 342/81 |
| 8,390,507 | B2 * | 3/2013 | Wintermantel | G01S 7/0233 |
| | | | | 342/70 |
| 8,816,902 | B2 * | 8/2014 | Itoh | G01S 3/74 |
| | | | | 342/104 |
| 9,097,796 | B2 * | 8/2015 | Mizutani | G01S 7/354 |
| 9,236,955 | B2 * | 1/2016 | Bahl | H04B 7/0452 |
| 9,689,967 | B1 * | 6/2017 | Stark | G01S 7/0233 |
| 9,772,401 | B2 | 9/2017 | Widmer et al. | |
| 10,823,836 | B2 * | 11/2020 | Wintermantel | G01S 13/584 |
| 10,965,025 | B2 * | 3/2021 | Kim | G01S 13/02 |
| 11,460,572 | B2 * | 10/2022 | Pedross-Engel | H04L 27/20 |
| 2003/0052813 | A1 * | 3/2003 | Natsume | G01S 13/345 |
| | | | | 342/107 |
| 2004/0246168 | A1 * | 12/2004 | Isaji | G01S 7/03 |
| | | | | 342/146 |
| 2005/0156780 | A1 * | 7/2005 | Bonthron | G01S 3/48 |
| | | | | 342/134 |
| 2006/0262007 | A1 * | 11/2006 | Bonthron | G01S 13/44 |
| | | | | 342/107 |
| 2007/0171123 | A1 * | 7/2007 | Nakano | G01S 7/4021 |
| | | | | 342/91 |
| 2008/0291088 | A1 * | 11/2008 | Nagai | G01S 13/48 |
| | | | | 342/374 |
| 2009/0303126 | A1 * | 12/2009 | Jain | G01S 13/003 |
| | | | | 342/368 |
| 2010/0075618 | A1 * | 3/2010 | Isaji | G01S 13/931 |
| | | | | 455/90.1 |
| 2010/0328157 | A1 * | 12/2010 | Culkin | H01Q 21/061 |
| | | | | 342/372 |
| 2012/0112955 | A1 * | 5/2012 | Ando | G01S 13/931 |
| | | | | 342/159 |
| 2013/0271311 | A1 * | 10/2013 | Izumi | H01Q 3/30 |
| | | | | 342/146 |
| 2015/0285897 | A1 * | 10/2015 | Kilty | G01S 7/35 |
| | | | | 342/201 |
| 2016/0282462 | A1 * | 9/2016 | Pitts | H01Q 21/30 |
| 2016/0377713 | A1 * | 12/2016 | Kamo | G01S 7/35 |
| | | | | 342/157 |
| 2017/0315224 | A1 * | 11/2017 | Mizutani | G01S 13/584 |
| 2018/0011180 | A1 * | 1/2018 | Warnick | H01Q 3/34 |
| 2018/0088224 | A1 * | 3/2018 | Kishigami | H01Q 21/06 |
| 2018/0088229 | A1 * | 3/2018 | Rajendran | G01S 13/18 |
| 2018/0252809 | A1 * | 9/2018 | Davis | G01S 13/32 |
| 2018/0294564 | A1 * | 10/2018 | Kim | G01S 13/02 |
| 2018/0351619 | A1 * | 12/2018 | Khan | H04B 7/0897 |

* cited by examiner

RECONFIGURABLE MIMO RADAR

CROSS-REFERENCE TO RELATED APPLICATIONS

The present application is a continuation of U.S. application Ser. No. 16/203,149, filed 2018 Nov. 28, titled "Reconfigurable MIMO Radar", which claims priority to Provisional U.S. Application No. 62/684,982, titled "Reconfigurable MIMO Radar" and filed 2018 Jun. 14 by inventors Danny Elad, Ofer Markish and Benny Sheinman, both of which are hereby incorporated herein by reference.

BACKGROUND

In the quest for ever-safer and more convenient transportation options, many car manufacturers are developing self-driving cars which require an impressive number and variety of sensors, often including arrays of acoustic and/or electromagnetic sensors to monitor the distance between the car and any nearby persons, pets, vehicles, or obstacles. Among the contemplated sensing technologies are multi-input, multi-output radar systems, though it can be cost-prohibitive to provide a sufficient number of transmitters and receivers for an adequately-performing antenna array. The prior art fails to offer a satisfactory solution to this dilemma.

SUMMARY

Accordingly, there are disclosed herein automotive radar systems and methods employing a reconfigurable connection of antennas to radar transmitters and/or receivers. An illustrative embodiment of an automotive radar system includes: a radar transmitter; a radar receiver; and a digital signal processor coupled to the radar receiver to detect reflections of a signal transmitted by the radar transmitter and to derive signal measurements therefrom. At least one of the radar transmitter and the radar receiver are switchable to provide the digital signal processor with signals from each of multiple antennas.

An illustrative embodiment of a radar measurement method includes: transmitting a radar signal with a radar transmitter; operating a radar receiver to provide a digital signal processor with a receive signal; processing the receive signal to detect reflections of the radar signal and to derive signal measurements therefrom; and switching at least one of the radar transmitter and radar receiver to provide the digital signal processor a receive signal from each of multiple combinations of transmit antenna and receive antenna.

Each of the foregoing embodiments may be employed individually or conjointly, and (as reflected by the claims) they may further employ one or more of the following optional features in any suitable combination: 1. at least some switching of the radar transmitter or radar receiver is performed during signal transmission by the radar transmitter. 2. the radar transmitter is switchable via a switch that couples an output of the radar transmitter to a selectable one of at least two transmit antennas. 3. the radar receiver is switchable via a switch that couples an input of a low noise amplifier to a selectable one of at least two receive antennas. 4. the radar receiver is switchable via a switch that couples an input of a downconverter to a selectable one of at least two low noise amplifiers, each low noise amplifier being coupled to a respective receive antenna. 5. the radar receiver is switchable via a switch that couples an input of an analog-to-digital converter to a selectable one of at least two downconverters, each downconverter being coupled to a respective receive antenna. 6. the radar receiver is switchable via gates that each block or pass a signal from a respective receive antenna to an input of an analog-to-digital converter. 7. the digital signal processor determines signal measurements for each available combination of transmit antenna and receive antenna. 8. the digital signal processor applies phased array processing to derive an image from the signal measurements. 9. at least one of the multiple antennas has a narrower beam width than another of the multiple antennas. 10. the signal measurements include distance and direction to at least one reflector. 11. the signal measurements include distance to each pixel of a beam-scan image.

It should be understood that the drawings and corresponding detailed description do not limit the disclosure, but on the contrary, they provide the foundation for understanding all modifications, equivalents, and alternatives falling within the scope of the appended claims.

DETAILED DESCRIPTION

Figure 1:
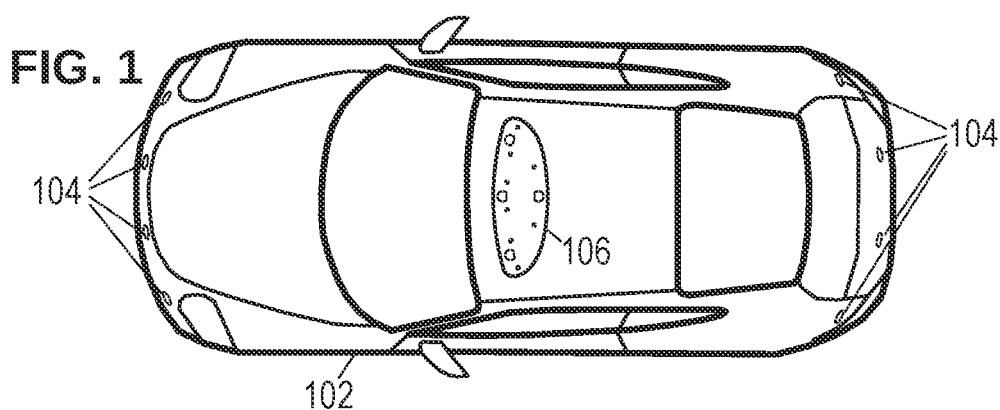
FIG. 1 is an overhead view of an illustrative vehicle equipped with sensors.

FIG. 1 shows an illustrative vehicle 102 equipped with a set of ultrasonic parking-assist sensors 104 and a multiple-input multiple-output (MIMO) radar antenna array 106. The type, number, and configuration of sensors in the sensor arrangement for vehicles having driver-assist and self-driving features varies. For example, at least some contemplated MIMO radar arrays for autonomous vehicles include four transmit antennas and eight or more receive antennas arranged to scan ahead of, around, and behind the vehicle. The vehicle may employ the sensor arrangement for detecting and measuring distances/directions to objects in the various detection zones to enable the vehicle to navigate while avoiding other vehicles and obstacles.

Figure 2:
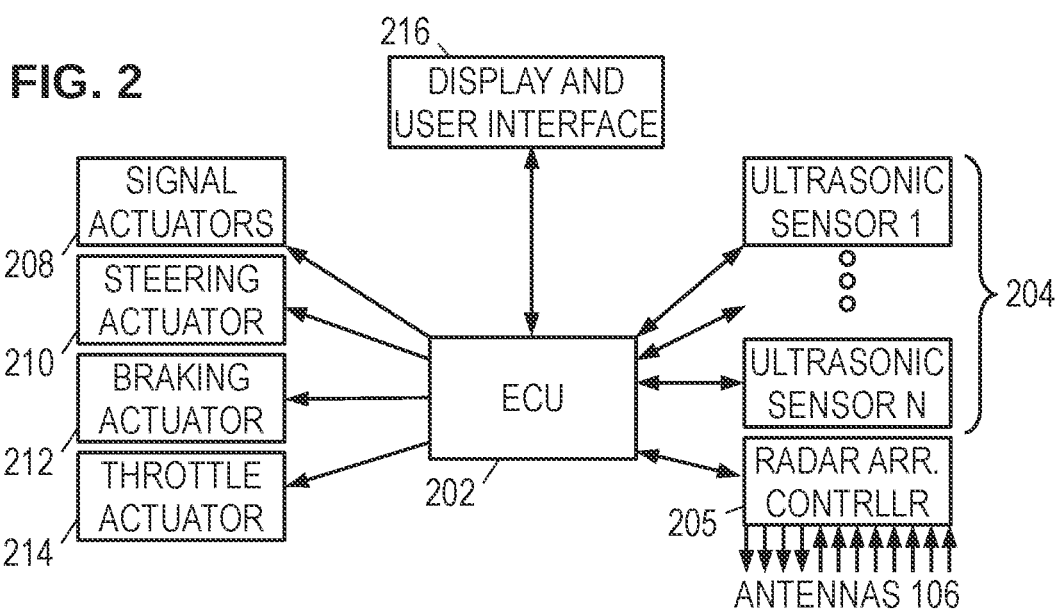
FIG. 2 is a block diagram of an illustrative driver-assistance system.

FIG. 2 shows an electronic control unit (ECU) 202 coupled to the various ultrasonic sensors 204 and a radar array controller 205 as the center of a star topology. Of course, other topologies including serial, parallel, and hierarchical (tree) topologies, are also suitable and contemplated for use in accordance with the principles disclosed herein. The radar array controller 205 couples to the transmit and receive antennas in the radar antenna array 106 to transmit electromagnetic waves, receive reflections, and determine a spatial relationship of the vehicle to its surroundings. To provide automated parking assistance, the ECU 202 may further connect to a set of actuators such as a turn-signal actuator 208, a steering actuator 210, a braking actuator 212, and throttle actuator 214. ECU 202 may further couple to a user-interactive interface 216 to accept user input and provide a display of the various measurements and system status.

Using the interface, sensors, and actuators, ECU 202 may provide automated parking, assisted parking, lane-change assistance, obstacle and blind-spot detection, autonomous driving, and other desirable features. In an automobile, the various sensor measurements are acquired by one or more electronic control units (ECU), and may be used by the ECU to determine the automobile's status. The ECU may further act on the status and incoming information to actuate various signaling and control transducers to adjust and maintain the automobile's operation. Among the operations that may be provided by the ECU are various driver-assist features including automatic parking, lane following, automatic braking, and self-driving.

To gather the necessary measurements, the ECU may employ a MIMO radar system. Radar systems operate by emitting electromagnetic waves which travel outward from the transmit antenna before being reflected back to a receive antenna. The reflector can be any moderately conductive object in the path of the emitted electromagnetic waves. By measuring the travel time of the electromagnetic waves from the transmit antenna to the reflector and back to the receive antenna, the radar system can determine the distance to the reflector. If multiple transmit or receive antennas are used, or if multiple measurements are made at different positions, the radar system can determine the direction to the reflector and hence track the location of the reflector relative to the vehicle. With more sophisticated processing, multiple reflectors can be tracked. At least some radar systems employ array processing to "scan" a directional beam of electromagnetic waves and construct an image of the vehicle's surroundings. Both pulsed and continuous-wave implementations of radar systems can be implemented, though frequency modulated continuous wave radar systems are generally preferred for accuracy.

Figure 3:
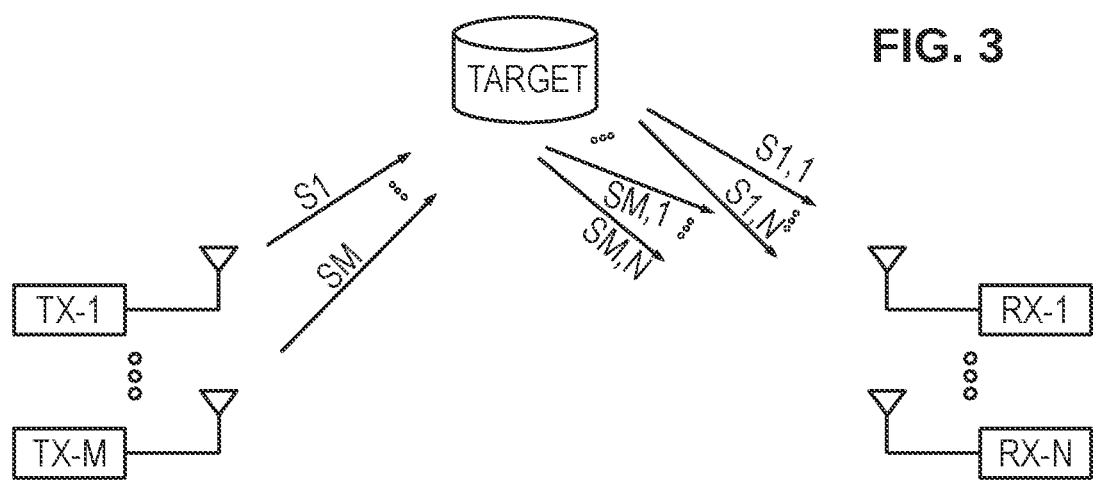
FIG. 3 is a schematic of an illustrative fixed multi-input, multi-output (MIMO) radar system.

FIG. 3 shows an illustrative system having a fixed MIMO configuration, in which M transmitters are coupled to M transmit antennas to concurrently send M transmit signals. The M signals may variously reflect from one or more targets to be received by N receive antennas coupled to N receivers. Each receiver may extract the amplitude and phase or travel delay associated with each of the M transmit signals, thereby enabling the system to concurrently obtain N*M measurements. Often the measurements need not be acquired concurrently, and the processing requirements associated with each receiver extracting M measurements can be reduced via the use of time division multiplexing and/or orthogonal coding.

Regardless, fixed MIMO systems employ a respective antenna for each transmitter or receiver. This one-to-one correspondence between antennas and transmitters/receivers is widely believed to offer certain advantages with respect to impedance matching and signal loss, and accordingly it has long been the norm.

However, the named inventors recognize that the greater the number of antennas, the greater the diversity of the system (i.e., the greater the number of independent measurements that the system can acquire and use for image formation). Moreover, the diversity gain can more than compensate for any switch losses incurred by associating multiple antennas with each transmitter or receiver, particularly in the context of automotive radar systems having certain contemplated features such as active reflectors.

Figure 4:
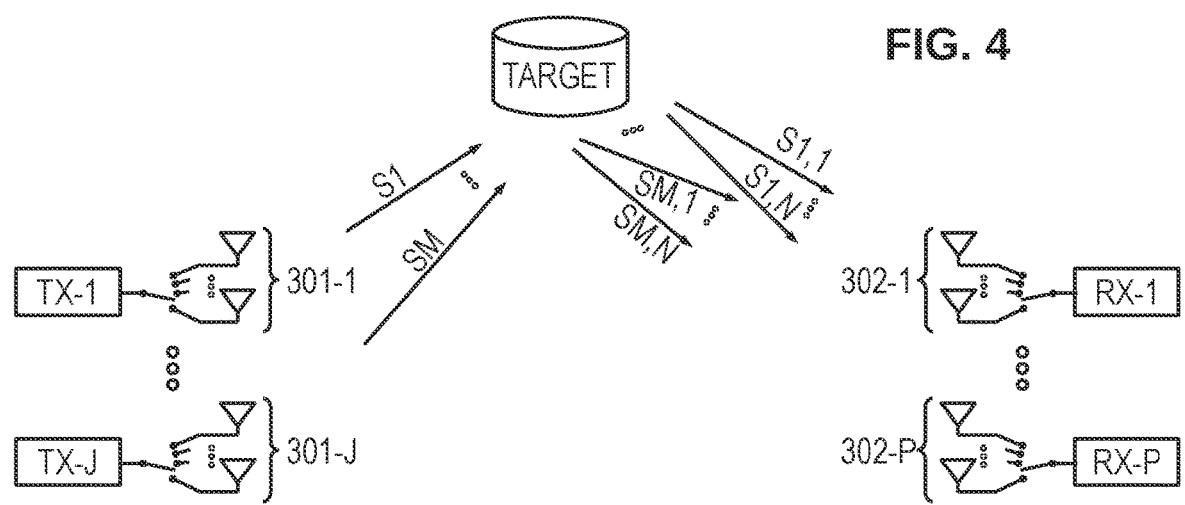
FIG. 4 is a schematic of an illustrative reconfigurable MIMO radar system.

Accordingly, FIG. 4 shows an illustrative reconfigurable MIMO radar system in which each transmitter can be selectively coupled to one of M corresponding transmit antennas, and each receiver can be selectively coupled to one of N corresponding receive antennas, enabling N*M measurements to be obtained by fewer transmitters and receivers, thereby maintaining measurement diversity of the system while significantly reducing the system's size and cost. Alternatively the number of transmitters and receivers may be maintained while increasing the number of antennas to significantly improve the performance of the system without substantially increasing the system's cost. (Radar switches and antennas can be made with less cost than radar transmitters and receivers.) The available antennas are systematically multiplexed to the available transmitters and receivers to collect the full set of measurements for radar imaging.

Figure 5:
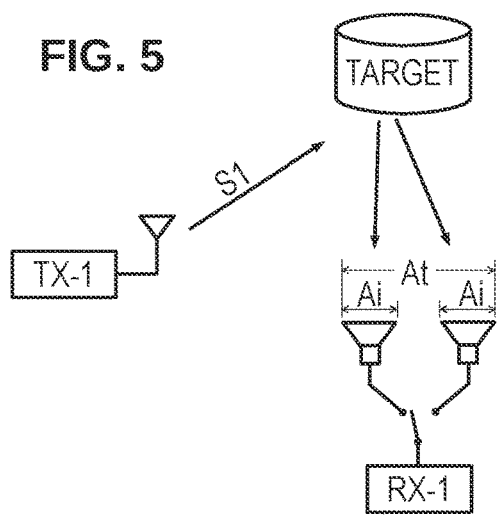
FIG. 5 is a schematic of one reconfigurable MIMO system application.

As shown in FIG. 5, the reconfigurable MIMO system can operate to improve the spatial resolution of radar and imaging systems while keeping the power consumption low. Each transmitter and receiver is sequentially connected to each of the available antennas, and the measurements are digitally combined for image formation having improved spatial resolution. The illustrated system includes a single transmitter with a single transmit antenna and a single receiver with two selectable receiving antennas. Selecting between the antennas is demonstrated using a switch. Other selection methods are possible as well.

By receiving the signal from the first antenna and then switching to the other antenna, the total aperture of the receiving system, $A_{tot}$, becomes larger than the aperture of the single antenna, $A_{single}$. Since image resolution is inversely proportional to the antenna aperture (large aperture generates narrow beam width), after suitable post processing the resolution increases. In contrast, a fixed MIMO system would require 2 receivers to be connected to the two receiving antennas in order to achieve the same resolution. Therefore, the reconfigurable MIMO approach provides increased resolution while keeping the power consumption low. In addition, since only a single receiver is used, the size of the chip that usually used to implement the receiver can be smaller and the system cost can be reduced.

Figure 6:
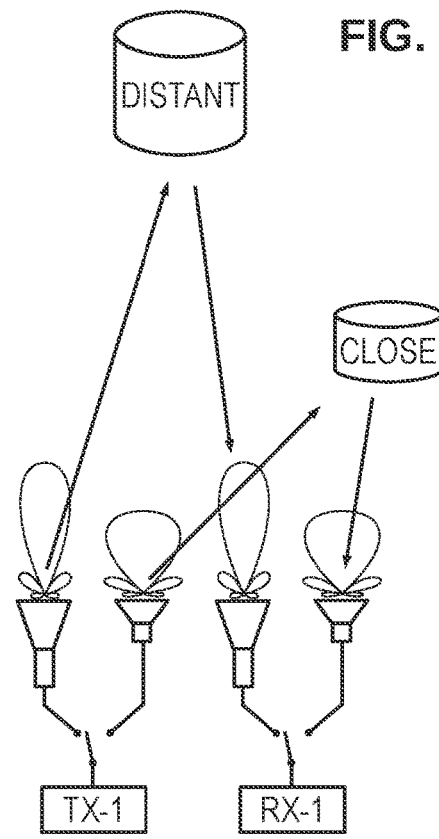
FIG. 6 is a schematic of a second reconfigurable MIMO system application.

As shown in FIG. 6, the reconfigurable MIMO system can operate to improve the range detection capabilities. To cover different detection ranges, the transmitters can be switched between transmit antennas having narrow and wide beam widths, and the receivers can be similarly switched between antennas having narrow and wide beam widths. The wide beam width antennas offer a wide field of view with better sensitivity to nearby targets but lack the range to detect distant targets. Conversely, narrow bandwidth antennas offer greater range for detecting distant targets but with their narrow field of view they may fail to detect nearby targets. The reconfigurable MIMO system may switch between the antennas systematically or as needed, thereby obtaining improved range detection capabilities beyond what would otherwise be currently feasible.

The illustrated system includes a single transmitter with two different transmitting antennas and a single receiver with two different receiving antennas. Selecting between the antennas is demonstrated using a switch. Other selection methods are possible as well. A more detailed explanation on potential switching techniques is provided below. For detection of distant targets (Long Range Radar, useful when traveling at high speed) a high gain and narrow beam width antenna is chosen. For detection of close targets (Short Range Radar, useful when traveling slowly through a crowded environment) a low gain and wide beam width antenna is chosen. A fixed MIMO solution requires 2 transmitters and 2 receivers to achieve the same dual-range capabilities. Therefore, the reconfigurable MIMO approach improves the imaging radar range capabilities while reducing the number of transmitters and receivers.

The proposed reconfigurable MIMO system approach connects several antennas to each transmitter or receiver using, e.g., a switch. The various new transmit-receive antenna combinations created by using the additional antennas can, with suitable digital processing, improve the performance of imaging radar systems. Among other things, better spatial resolution, better range detection capabilities, and better power consumption can be achieved compared to existing radar solutions, and the principles disclosed herein may also be applicable to wireless communication systems (e.g., 5G). In the case of communications, the main purpose of the reconfigurable MIMO is to improve the communication capacity in multipath environments. In the case of radar systems, the reconfigurable MIMO approach can also provide improved performance in multipath environments, but perhaps more importantly it can improve angular resolution, multi-target tracking, and potentially provide multiple modes for increasing the detection range.

FIGS. 7A-7D show various illustrative antenna selection techniques. Though the selection techniques are illustrated for the receive antennas, they can be similarly implemented on the transmitter side as well.

Figure 7A:
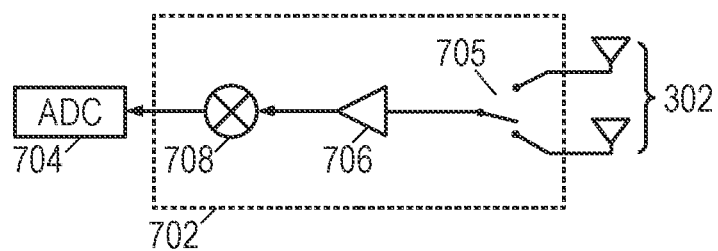
FIGS. 7A-7D are schematics of various illustrative configurations for an antenna-switching receiver.

FIG. 7A shows a receiver 702 selectively coupling one of multiple receiver antennas 302 to an analog-to-digital converter (ADC) 704. The receiver 702 includes a separate connection terminal for each receive antenna 302, and a switch 705 that selectively couples one of the terminals to a low noise amplifier (LNA) 706. LNA 706 amplifies the receive signal from the selected antenna to improve the received signal strength, but it is not mandatory. The output of LNA 706 is coupled to a mixer 708, which multiplies the amplified receive signal with a reference signal to convert the amplified receive signal to baseband. The reference signal may be, e.g., a carrier signal, a frequency-modulated carrier signal, or a buffered version of the transmit signal. The mixer 708 and/or ADC 704 include filters to block harmonics from the down-conversion process. ADC 704 digitizes the baseband signal for further digital signal processing, which determines distance and direction information for the reflectors producing the receive signal.

Figure 7B:
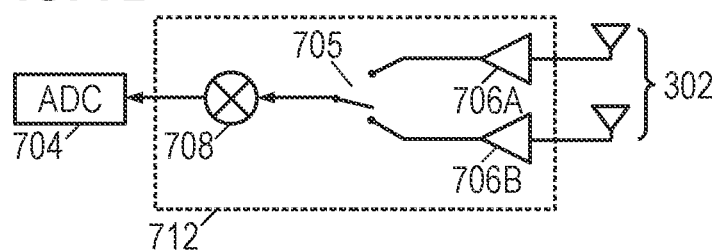

Switch 705 may be, e.g., a mechanical switch or a switch implemented using transistors that convey weak high frequency signals with minimal attenuation or distortion. The design of FIG. 7A imposes stringent performance requirements on the switch. FIG. 7B shows a receiver 712 that somewhat relaxes the performance requirements for switch 705. In the design of receiver 712, each antenna connection terminal is provided with a respective LNA 706A, 706B. Switch 705 is placed downstream of the LNAs to select between the amplified signals they produce. The switch provides the selected signal to the input of mixer 708.

Figure 7C:
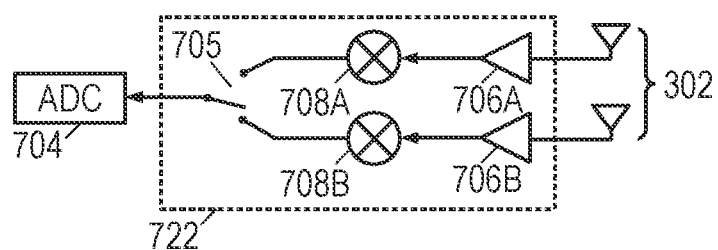

While the design of receiver 712 enables the switch 705 to work with stronger signals, there remains a requirement for good high frequency performance. FIG. 7C shows a receiver 722 that further relaxes the performance requirements of switch 705. As with receiver 712, receiver 722 includes a respective LNA 706A, 706B for each antenna connection terminal. Receiver 722 further includes a respective mixer 708A, 708B to down-convert the amplified receive signals from each LNA. Switch 705 selects between the baseband receive signals produced by the mixers 708A, 708B. Because the spectrum of the baseband signals excludes high frequency content, a traditional transistor-based switch or multiplexer can be employed to implement switch 705.

Figure 7D:
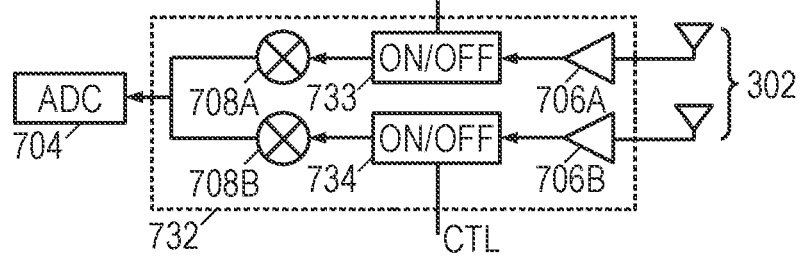

FIG. 7D shows a receiver 732 which combines certain features of receivers 712 and 722. Receiver 732 includes respective mixers 708A, 708B for down-converting the receive signals from different antennas, but rather than having a switch 705 downstream of the mixers, receiver 732 has a gate 733 to selectively block or pass an amplified receive signal from LNA 706A to mixer 708A, and a second gate 734 to selectively block or pass an amplified receive signal from LNA 706B to mixer 708B. The gates 733, 734 are operated in a complementary fashion such that no more than one at a time passes an amplified signal onward.

Figure 8:
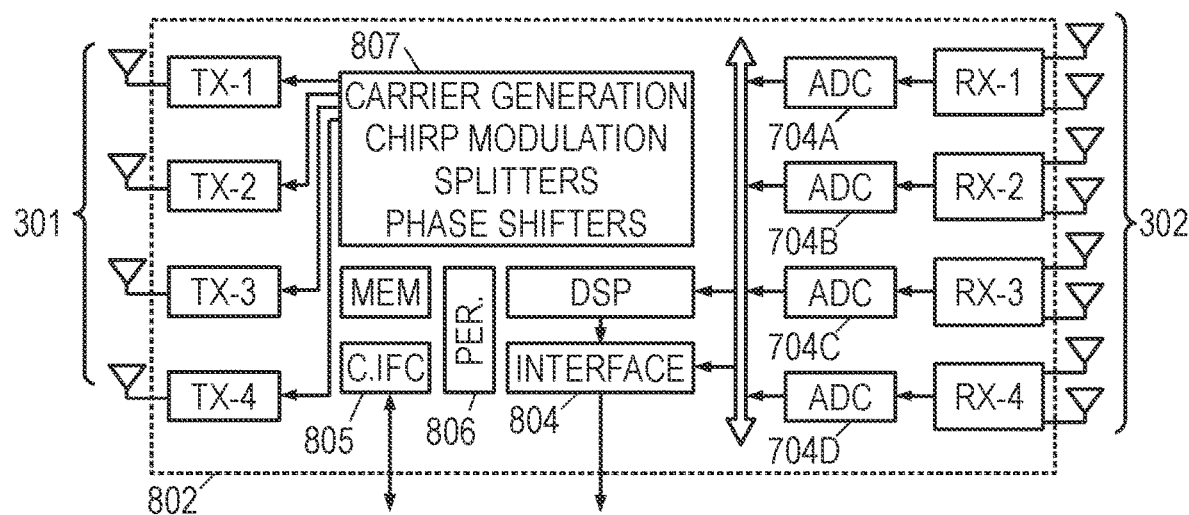
FIG. 8 is a block diagram of an illustrative MIMO radar transceiver chip.

FIG. 8 shows a block diagram of an illustrative transceiver chip 802 for a reconfigurable MIMO system. It includes 4 receivers (RX-1 through RX-4) each of which is selectably coupled to two receive antennas 302, providing a reconfigurable MIMO system with 8 receive antennas, four of which can be employed concurrently to collect measurements. Four ADCs 704A-704D sample and digitize the baseband receive signals from the receivers RX-1 through RX-4, supplying the digitized signals to a digital signal processor (DSP) for filtering and processing, or directly to a high-bandwidth interface 804 to enable off-chip processing of the digitized baseband signals. If used, the DSP generates image data that can be conveyed to an ECU via the high-bandwidth interface 804.

A control interface 805 enables the ECU or other host processor to configure the operation of the transceiver chip 802, including the test and calibration circuitry 806 and the transmit signal generation circuitry 807. Circuitry 807 generates a carrier signal within a programmable frequency band, with a programmable chirp rate and range. Splitters and phase shifters enable the multiple transmitters TX-1 through TX-4 to operate concurrently if desired. In the illustrated example, the transceiver chip 802 includes 4 transmitters (TX-1 through TX-4) each of which is fixedly coupled to a corresponding transmit antenna 301. In alternative embodiments, multiple transmit antennas are selectably coupled to each of the transmitters.

A potential disadvantage of employing a reconfigurable MIMO system with multiple receive antennas is the time required to repeat measurements with different combinations of transmit and receive antennas. In certain contemplated embodiments, the time required may be minimized by performing antenna switching during ongoing signal transmission. For example, while a transmitter is sending a transmit signal from a selected antenna, each receiver may acquire a first measurement with a first selected antenna and then, while the pulse transmission continues, switch to a second selected antenna to collect a second measurement. Additionally, or alternatively, while the transmitter is sending a transmit pulse via a first selected antenna, the transmitter may switch to a second selected antenna, enabling each receiver to obtain measurements responsive to the use of each transmit antenna.

Though the operations described herein may be set forth sequentially for explanatory purposes, in practice the method may be carried out by multiple components operating concurrently and perhaps even speculatively to enable out-of-order operations. The sequential discussion is not meant to be limiting. Moreover, the focus of the foregoing discussions has been radar sensors, but the principles are applicable to any MIMO transducer array systems. These and numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. An automotive radar system, comprising:
a radar transmitter;
a radar receiver;
a digital signal processor coupled to the radar receiver configured to detect reflections of a signal transmitted by the radar transmitter and configured to derive signal measurements therefrom,
the radar receiver comprising switchable via gates that each block or pass a signal from a respective receive antenna to an input of an analog-to-digital converter; and
wherein at least one of the receive antennas has a narrower beam width than another of the receive antennas.

2. The automotive radar system of claim 1, wherein at least some switching of the radar receiver is performed during signal transmission by the radar transmitter.

3. The automotive radar system of claim 1, wherein the digital signal processor is configured to determine signal measurements for each available combination of transmit antenna and receive antenna.

4. The automotive radar system of claim 1, wherein the digital signal processor is configured to apply phased array processing to derive an image from the signal measurements.

5. A radar measurement method, comprising:
transmitting a radar signal with a radar transmitter;
operating a radar receiver to provide a digital signal processor with a receive signal;
processing the receive signal to detect reflections of the radar signal and to derive signal measurements therefrom; and
switching the radar receiver to provide the digital signal processor a receive signal from each of multiple combinations of transmit antenna and receive antenna, the radar receiver being switchable via gates that each block or pass a signal from a respective receive antenna to an input of an analog-to-digital converter, wherein at least one of the receive antennas has a narrower beam width than another of the receive antennas.

6. The radar measurement method of claim 5, wherein at least some switching of the radar receiver is performed during signal transmission by the radar transmitter.

7. The radar measurement method of claim 5, wherein the digital signal processor determines signal measurements for each available combination of transmit antenna and receive antenna.

8. The radar measurement method of claim 5, wherein the digital signal processor applies phased array processing to derive an image from the signal measurements.

* * * * *